United States Patent [19]
Thompson

[11] 3,982,398
[45] Sept. 28, 1976

[54] THERMAL ACTUATOR, METHOD OF CONTROLLING SUCH AND ACTUATING SYSTEM

[75] Inventor: Paige W. Thompson, Morrison, Ill.

[73] Assignee: General Electric Company, Fort Wayne, Ind.

[22] Filed: Jan. 15, 1974

[21] Appl. No.: 433,594

[52] U.S. Cl. .................................................. 60/531
[51] Int. Cl.² .......................................... F03G 7/06
[58] Field of Search........... 60/531; 236/68 A, 99 R; 73/368.4

[56] References Cited

UNITED STATES PATENTS

| | | | |
|---|---|---|---|
| 896,526 | 8/1908 | Fournier | 73/368.4 |
| 1,920,458 | 8/1933 | Bast | 236/99 R |
| 1,945,745 | 2/1934 | Jauvert | 236/99 R |
| 2,050,668 | 8/1936 | Persons | 60/531 |
| 2,322,762 | 6/1943 | Malone | 60/531 X |
| 2,373,130 | 4/1935 | Malone | 60/531 |
| 2,427,900 | 9/1947 | Camilli et al. | 200/140 |
| 3,911,682 | 10/1975 | Thompson | 60/531 |

FOREIGN PATENTS OR APPLICATIONS

| | | | |
|---|---|---|---|
| 436,695 | 10/1935 | United Kingdom | 60/531 |
| 444,387 | 3/1936 | United Kingdom | 60/531 |
| 517,192 | 1/1940 | United Kingdom | 60/531 |

*Primary Examiner*—Alan Cohan
*Assistant Examiner*—Gerald A. Michalsky
*Attorney, Agent, or Firm*—Joseph E. Papin

[57] ABSTRACT

A thermal actuator has a pair of means for containing a vaporizable liquid which communicate with each other, and means within one of the containing means effects only the transfer therefrom of vapor toward the other of the containing means upon the vaporization of at least a portion of the liquid in the one containing means under preselected conditions.

Another thermal actuator has a pair of means for containing a vaporizable liquid which communicate with each other. Means within one of the containing means permits displacement of only a portion of the liquid in its liquid state therefrom to the other of the containing means and effects transfer of at least a portion of vapor vaporized from the remaining liquid in the one containing means under other preselected conditions toward the other containing means.

Methods of controlling the thermal actuators and actuating systems including the thermal actuators are also disclosed.

30 Claims, 5 Drawing Figures

THERMAL ACTUATOR, METHOD OF CONTROLLING SUCH AND ACTUATING SYSTEM

BACKGROUND OF THE INVENTION

This invention relates generally to control devices as may be used in electrical switches or fluid valves or the like and in particular to thermal actuators, methods of controlling such of an expansible one of a pair of means for containing a vaporizable fluid in a thermal actuator, and actuating systems in which thermal actuators may be employed.

In the past, various thermal actuators and actuating systems utilizing such have been provided. Most of the past thermal actuators had a container or boiler adapted to be heated by various means well known in the art to vaporize at least a portion of a vaporizable liquid substantially completely filling the boiler, and the boiler was communicated through a relatively small opening with an expansible chamber also filled with the vaporizable liquid and having a wall free to move in response to changing pressures. When the boiler was heated under preselected conditions to effect vaporization of the liquid therein, the established vapors increased the pressure in the boiler forcing the liquid therefrom through the opening into the expansible chamber moving its movable wall for transmitting an actuating or output force to operate various electrical switch or fluid valve components. Of course, the boiler and expansible chamber were generally thermally insulated from each other thereby to effect cooling of the transferred liquid from the heated boiler to the relatively cooler environs of the expansible chamber, and upon termination of the heating of the boiler under other preselected conditions, the transferred liquid was returned upon contraction or collapse of the expansible chamber back to the boiler thereby to eliminate the output force transmitted by the movable wall of the expansible chamber.

One such past thermal actuator is shown in U.S. Pat. No. 2,595,846, and while this patented thermal actuator provided at least some advancement in the art, one of the disadvantageous or undesirable features thereof is believed to be that it was too fast acting in that only a relatively small amount of its vaporizable liquid was vaporized to effect the complete displacement of the liquid from the boiler to the expansible chamber. While the patented thermal actuator was effective to actuate the single switching device associated therewith, it is doubtful that other switching devices could be effectively combined therewith for sequential actuation by the patented thermal actuator due to the too fast or relatively uncontrolled actuation or liquid transfer characteristics thereof.

In U.S. Pat. No. 2,050,668, another thermal actuator is provided with a discharge nozzle which is beneath and angled with respect to the hot surface of the vaporizable liquid in the boiler thereby to cause a swirling action of the relatively cooler liquid returning to the boiler from the expansible chamber for effecting rather quick collapse thereof while obviating such collapse in the event of outside vibrations. The rate of collapse of the expansible chamber may be regulated by varying the angle of the discharge nozzle relative to the hot surface of the liquid in the boiler; however, it is believed that the disadvantageous or undesirable features discussed above with respect to U.S. Pat. No. 2,595,846, are also attendent to this patented device.

U.S. Pat. No. 2,086,819 discloses a thermal actuator having a valved passage through which a vaporizable liquid is passed in only one direction to an expansible chamber from a boiler upon heating to vaporize the vaporizable liquid therein. Another valved passage is provided through which the relatively cool liquid is returned in the other direction from the expansible chamber to the top portion of the boiler splashing it downwardly therein allegedly to increase the rate of cooling of the boiler and condensation therein upon termination of heating of the boiler. However, it is believed that the same disadvantageous or undesirable features discussed hereinabove with respect to the other prior art thermal actuators are also attendent to the thermal actuator of U.S. Pat. No. 2,086,819.

In U.S. Pat. No. 2,080,576, a diaphragm having an orifice therein is provided adjacent the bottom of a boiler which is communicated with an expansible chamber. Upon heating of the boiler, vapor is generated from a vaporizable liquid therein for depressing the liquid from the boiler through the orifice to the expansible chamber to effect the force transmitting actuation thereof. When heating of the boiler is terminated, the relatively cooler liquid returns from the expansible chamber in response to the collapse thereof through the orifice which creates a jet of the returning liquid so that is sprayed within the boiler allegedly causing quick cooling of the walls thereof. Nevertheless, it is believed that the thermal actuator of this patent also has the same disadvantageous or undesirable features as previously discussed herein with respect to the other prior art thermal actuators.

SUMMARY OF THE INVENTION

Among the several objects of the present invention may be noted the provision of novel thermal actuators, methods of controlling the driving of an expansible one of a pair of means for containing a vaporizable fluid in a thermal actuator, and actuating systems which overcome the disadvantageous or undesirable features discussed hereinabove, as well as others, with respect to the prior art; the provision of such a thermal actuator, method, and actuating system in which only the vapor of a vaporizable liquid heated under preselected conditions is transferred from a container therefor to a communicating, liquid filled, expansible container for effecting work thereof; the provision of such a thermal actuator, method, and actuating system in which a communicating passage between the containers includes means in the heated one of the containers predeterminately spaced above a preselected fill level for the liquid therein for preventing liquid transfer therefrom; the provision of such a thermal actuator, method, and actuating system in which both the vapor of a vaporizable liquid and the vaporizable liquid in its liquid state heated under preselected conditions is transferred from a container therefor to a communicating, liquid filled, expansible container for effecting work thereof; the provision of such a thermal actuator, method, and actuating system in which a communicating passage between the containers includes means in the heated one of the containers predeterminately spaced beneath a preselected fill level for the liquid therein for permitting the transfer of only a predetermined amount of liquid to the expansible chamber prior to the transfer thereto of the vapor; the provision of such a thermal actuator, method, and actuating system in which the rate of transfer of the liquid from the heated container is different than the rate of transfer of the vapor; the provision of such a thermal actuator having a relatively low thermal mass and large cooling area to permit effective and relatively fast cyclical actuation thereof; and the provision of such a thermal actuator, method, and actuating system which is simplistic, economically manufactured, and easily assembled. Other objects and features will be in part apparent and in part pointed out hereinafter.

In general, a thermal actuator in one form of the invention has a pair of means for containing a vaporizable liquid and communicating with each other. Means within one of the containing means effects only the transfer therefrom of vapor toward the other of the containing means upon the vaporization of at least a portion of the liquid in the one containing means under preselected conditions.

Also in general, a method in one form of the invention for driving an expansible one of a pair of means for containing a vaporizable liquid and communicated with each other in a thermal actuator comprises preventing transfer of the liquid in its liquid state only to the expansible one of the containing means from the other of the containing means. At least a portion of the liquid in the other containing means is vaporized, and at least a portion of the vapor is transferred from the other containing means to the expansible one of the containing means to effect the driving thereof.

Further and in general, an actuating system in one form of the invention has a driven device and a pair of sources for vaporizable liquid. Means is provided for the passage only vapor vaporized from the liquid in one of the sources under preselected conditions, and the other source includes means movable in response to increasing pressure accompanying the vaporization and passage of the vapor for driving the driven device.

In general, another thermal actuator in one form of the invention has a pair of means for containing a vaporizable liquid and communicating with each other. Means within one of the containing means permits displacement of only a portion of the liquid in its liquid state therefrom to the other of the containing means under preselected conditions and effects transfer of at least a portion of vapor vaporized from the remaining liquid in the one containing means under other preselected conditions toward the other containing means.

Also in general, another method in one form of the invention of driving an expansible one of a pair of means for containing a vaporizable liquid and communicated with each other in a thermal actuator comprises displacing only a portion of the liquid in its liquid state from the other of the containing means to the expansible one of the containing means to drive it by effecting vaporization of the liquid in the other containing means under preselected conditions. At least a portion of the liquid remaining in the other containing means is then vaporized under other preselected conditions, and at least a portion of the vapor is transferred from the other containing means toward the expansible one of the containing means to further effect the driving thereof.

Further and also in general, another actuating system in one form of the invention has a driven device and a pair of sources of vaporizable liquid. Means for communicating the sources include means for effecting displacement of only a portion of the liquid from one of the sources to the other of the sources under preselected conditions and for effecting displacement of at least a portion of vapor vaporized from the liquid remaining in the one source toward the other source under other preselected conditions. The other source includes means movable in response to increasing pressure accompanying the displacement of the liquid and the vapor for driving the driven device.

BRIEF DESCRIPTION OF THE DRAWINGS

Corresponding reference characters indicate corresponding parts throughout the several views of the drawings.

The following examples illustrate the invention and are not to be construed as limiting in any manner.

DESCRIPTION OF THE PREFERRED EMBODIMENT

Figure 1:
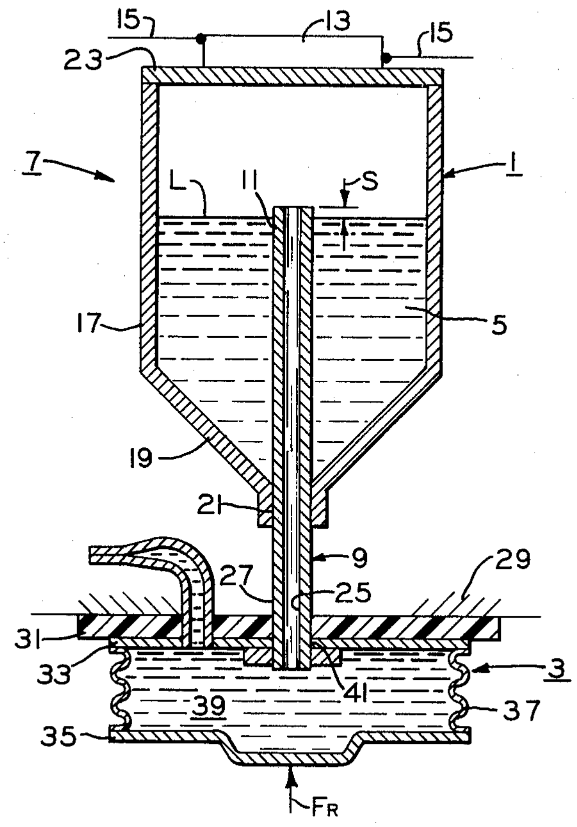
FIG. 1 is a schematic view illustrating a thermal actuator in one form of the present invention and teaching principles of a method also in one form of the invention which may be utilized to effect operation of the thermal actuator.
Figure 2:
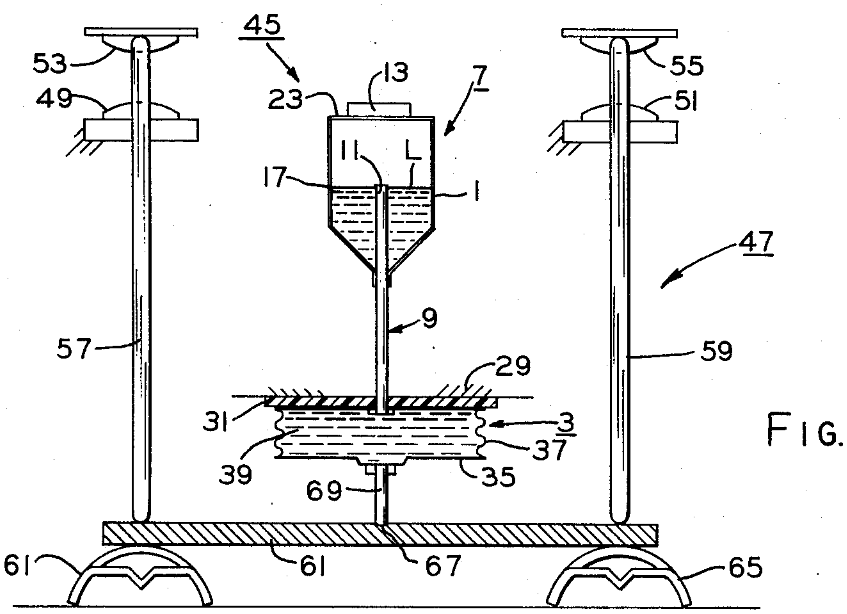
FIG. 2 is another schematic view illustrating the thermal actuator of FIG. 1 in an actuating system for an electrical switch device also embodying one form of the present invention.

Referring now to FIGS. 1 and 2 in general, a method in one form of the invention is illustrated for controlling the driving of an expansible one of a pair of means, such as a boiler 1 and bellows 3 or the like, for containing a vaporizable liquid 5, such as alcohol or other suitable vaporizable liquids well known in the art, and communicated with each other in a thermal actuator indicated generally at 7. In this method, transfer is prevented of vaporizable liquid 5 in its liquid state only to the expansible one of the containing means or bellows 3 from the other of the containing means or boiler 1. At least a portion of liquid 5 is vaporized in boiler 1, and at least a portion of the vapor is transferred from the boiler to bellows 3 to effect the driving thereof.

More particularly, means, such as a standpipe 9 or other suitable conduit, for transferring or effecting the transfer of the vapors is disposed between boiler 1 and bellows 3 with an upper or open end portion 11 selectively spaced, as indicated at S, generally above a predetermined or preselected fill level L of liquid 5 in the boiler. It may be noted that fill level L of liquid 5 in boiler 1 is less than the capacity of the boiler and may be of any selected level therein so long as upper end portion 11 of the transfer means or standpipe 9 extends above the level by any selected space S. The actual length of selected space S is not critical in itself and may extend to any measurement above fill level L, or upper end portion 11 of standpipe 9 may, if desired, be generally co-extensive with the fill level. Selected space S of standpipe 9 is provided above fill level L, as shown, to prevent transfer of liquid 5 in its liquid state through the standpipe thereby to insure only transfer therethrough of vapors upon the vaporization of the liquid in boiler 1. Vaporization of liquid 5 may be accomplished by energization of any suitable heating means thermally associated with boiler 1, as well known in the art, and for this purpose, a positive temperature coefficient resistor (PTCR) 13 is disposed in heat exchange relation with boiler 1 and connected in leads 15 of an electrical energizing circuit (not shown) effective to operate the PTCR between energized and de-energized states. As well known in the art, such electrical energizing circuit, and therefore PTCR 13, may be made to function upon the occurrence of a certain condition or conditions, such as may be effected by temperature, pressure time or the like. Energization of PTCR 13 heats boiler 1 and liquid 5 therein at least to a temperature effecting vaporization of the liquid which is accompanied by a corresponding increase in pressure in the boiler and bellows 3. The vapor so effected is transferred or otherwise conducted from boiler 1 through standpipe 9 to bellows 3, and the vapor so transferred is adapted to be subsequently condensed in the relatively cooler environs of the bellows, i.e., at least when the vapor is subjected to the liquid in the bellows. In this manner, a desired vapor pressure is attained at a desired operating temperature, and the transfer of vapor and subsequent condensation thereof generally equalizes the pressure in both boiler 1 and bellows 3 which serves to expand or drive the bellows for effecting an output or working force.

Referring now to FIG. 1 in detail, thermal actuator 7 has a pair of means, such as boiler 1 and bellows 3, for containing vaporizable liquid 5 and communicated with each other. Means, such as upper end portion 11 of standpipe 9, within boiler 1 effects or permits only the transfer therefrom of vapor toward bellows 3 upon the vaporization of at least a portion of liquid 5 in the boiler under preselected conditions. Boiler 1 is formed of a metal having relatively great heat transfer or conduction characteristics, as is well known in the art, and is provided with an annular side wall 17 which is tapered at 19 to define an aperture 21 in the lower end of the boiler. A closure member 23 is connected to the upper end of boiler side wall 17 by suitable means, such as soldering or the like as is well known to the art (not shown), and it may be noted that boiler 1 and liquid 5 therein preferably presents a relatively small thermal mass compared to the relatively great cooling or surface area thereof. Means, such as PTCR 13, for heating liquid 5 in boiler 1 to effect vaporization thereof is disposed in heat transfer relation with closure member 23, and while the PTCR may be electrically insulated by suitable dielectric material from the closure member if desired, the PTCR may be mounted in direct thermal conductive association or abutting engagement with the upper or exterior end of the closure member.

Standpipe or tube 9 is provided with a passage or opening 25 therethrough communicating between boiler 1 and bellows 3, and the standpipe is formed just large enough to allow ready equalization of fluid pressure and small enough to minimize conduction of heat between the boiler and bellows. Preferably, standpipe 9 is formed of a metal having relatively high thermal resistivity characteristics, such as that known commercially as "Nichrome", as is well known in the art. Standpipe 9 is fixedly disposed by suitable means, such as soldering or the like (not shown), within aperture 21 of boiler 1 and extends into the interior or liquid fill chamber of the boiler so that upper end portion 11 of the standpipe extends the selected space or distance S above predetermined fill level L of liquid 5 in the boiler. Since upper end portion 11 of standpipe 9 is above or at least generally coextensive with fill level L, transfer of liquid 5 in its liquid state through standpipe passage 25 is obviated. A lower end portion 27 of standpipe 9 extends through a support, indicated generally at 29, for thermal acutator 7 and alternative thermal insulating material 31, which can also be used to generally thermally isolate boiler 1 and bellows 3, into fixed connection with the bellows. If standpipe 9 can effect suitable thermal insulation between boiler 1 and bellows 3, than insulation material 31 may be omitted from thermal actuator 7.

Bellows 3 is provided with a pair of generally annular, opposite end walls 33, 35 having an annular, expansible, resilient member 37 of relatively low positive gradient spring rate fixedly interposed therebetween by suitable means, such as soldering or the like (not shown), and an expansible chamber 39 which is generally filled completely with liquid 5 is defined within the expansible member between the end walls. Lower end wall 35 is movable in response to expansion of chamber 39 for delivering an output or working force in opposition to a reaction force, indicated by arrow $F_R$, and an aperture 41 is provided in upper end wall 33 in which standpipe lower end portion 27 is fixedly received by suitable means such as soldering or the like (not shown). To complete the description of thermal actuator 7, upper end wall 33 of bellows 3 is fixedly secured by suitable connection means well known in the art (not shown) to support 29 against displacement therefrom.

Referring now to FIG. 2, in general there is shown at 45 an actuating system having a driven device, such as for instance an electrical switch or sequencer or the like indicated generally at 47, and a pair of sources, such as boiler 1 and bellows 3, for vaporizable liquid 5. Means, such as standpipe 9, is provided for transferring liquid and the passage of only vapor vaporized from liquid 5 in boiler 1 under preselected conditions toward bellows 3 generally at a predetermined displacement or transfer rate, and the bellows includes means, such as expansible member 37 and lower end wall 35, movable in response to increasing pressure accompanying the vaporization and passage of the vapor for driving driven device 47.

More particularly, electrical switch 47 is provided with a pair of stationary contacts 48, 51 and a pair of movable contacts 53, 55 for making engagement with each other, respectively, and the movable controls are normally urged toward a breaking position disengaged from the stationary contacts by actuators 57, 59. The lower ends of actuators 57, 59 are engaged with and driven by opposite ends of a lever 61 which is supported adjacent the opposite ends by a pair of resilient means, such as toggles 63, 65, each of which have different and higher rates of negative spring gradient than the rate of positive spring gradient of bellows expansible member 37 so as to afford snap-action to movable contacts 53, 55 upon actuation of electrical switch 47, as described hereinafter. To complete the description of actuating system 45, a pivot socket or the like 67 is provided on lever 61, and a connecting pin 69 is disposed in force transmitting engagement between bellows lower end wall 35 and pivot socket 67 for imparting the output or working force of thermal actuator 7 to lever 61 against the reaction force $F_R$ thereof.

In the operation, when PTCR 13 is energized in response to a certain or preselected condition, heat is transferred therefrom through closure member 23 and side wall 17 of boiler 1 to liquid 5 therein. When the temperature necessary to effect vaporization of heated liquid 5 is attained, the expansion of the vapor effected thereby effects a corresponding increase in pressure within thermal actuator 7; however, there is a time lag effected by the heat rise of boiler 1 and liquid 5 between the energization of PTCR 13 and the attainment of the vaporization temperature of the liquid. The vapor so established in boiler 1 is transferred or flows therefrom generally at the predetermined displacement or transfer rate through passage 25 of standpipe 9 toward expansible chamber 39 of bellows 3, and since insulation material 31 serves to thermally isolate the boiler and bellows, the transferred vapor is generally condensed upon reaching the generally cooler environs of the bellows, as previously mentioned. In this manner, it may be noted that only vapor is transferred from boiler 1 to bellows 3, and the transferred vapor condenses back to the liquid state in the cooler environs of the bellows. Further, as the vaporization of liquid 5 continues in boiler 1, fluid pressure within thermal actuator 7 correspondingly increases and acts on the effective area of bellows 3 causing the expansion of expansible chamber 39 to generate the output or working force of the bellows. The working force is transmitted through connecting link 69 to lever 67 against the inherent resilient forces of toggles 63, 65. When the working force is increased to a magnitude great enough to overcome the resilient force of toggle 63, lever 61 is pivoted about toggle 65 effecting deflection of toggle 63. Toggle 63 is arbitrarily chosen as having the lesser force of toggles 63, 65 merely for the sake of brevity and illustration. Since deflection of toggle 63 imparts snap-action pivotal movement to lever 61, the following movement of actuator 57 with the lever effects snap-action closure of movable contact 53 into making engagement with stationary contact 49. Upon further increase of fluid pressure within thermal actuator 7 in response to continued vaporization of liquid 5 therein, as previously mentioned, the magnitude of the working force is correspondingly increased to a value overcoming the resilient force of toggle 65 wherein lever 61 is pivoted about deflected toggle 63 to effect deflection of toggle 65. Deflection of toggle 65 imparts snap-action pivotal movement to lever 61, and the following movement of actuator 59 with the lever effects snap-action closure of movable contact 55 into making engagement with stationary contact 51. After closure of contacts 49, 53 and 51, 55 as above described, thermal actuator 7 will reset itself terminating the cycle of actuating system 45 and repositioning the components of electrical switch 47 for a subsequent cycle of the actuating system.

During reset upon de-energization of PTCR 13 to terminate heating of boiler 1, the boiler begins to cool effecting condensation of a slight amount of vapor therein which results in a corresponding slight decrease in the fluid pressure within the boiler. Upon this slight decrease in pressure in boiler 1, the relatively cooler liquid 5 in bellows 3 flows therefrom at a different displacement or transfer rate through passage 25 of standpipe 9 returning to the boiler thereby to equalize the pressure between the boiler and the bellows. This return flow of relatively cool liquid 5 causes immediate additional condensation in boiler 1 by chilling the vapor therein thus causing more liquid return flow from bellows 3 to the boiler. In this manner, condensation of vapor in boiler 1 is rather raid since the return flow of relatively cool liquid 5 from bellows 3 continues to chill the vapor until the boiler is again filled to its predetermined fill level L. As the pressure in thermal actuator 7 is reduced by the return flow of displaced liquid 5 to boiler 1, as described above, the output force is correspondingly reduced and eventually overcome by the opposing resilient forces of toggles 63, 65 permitting the return of the components of the electrical switch 47 to their original positions substantially in a sequence reverse to that effected during actuation or energization of the electrical switch.

Figure 5:
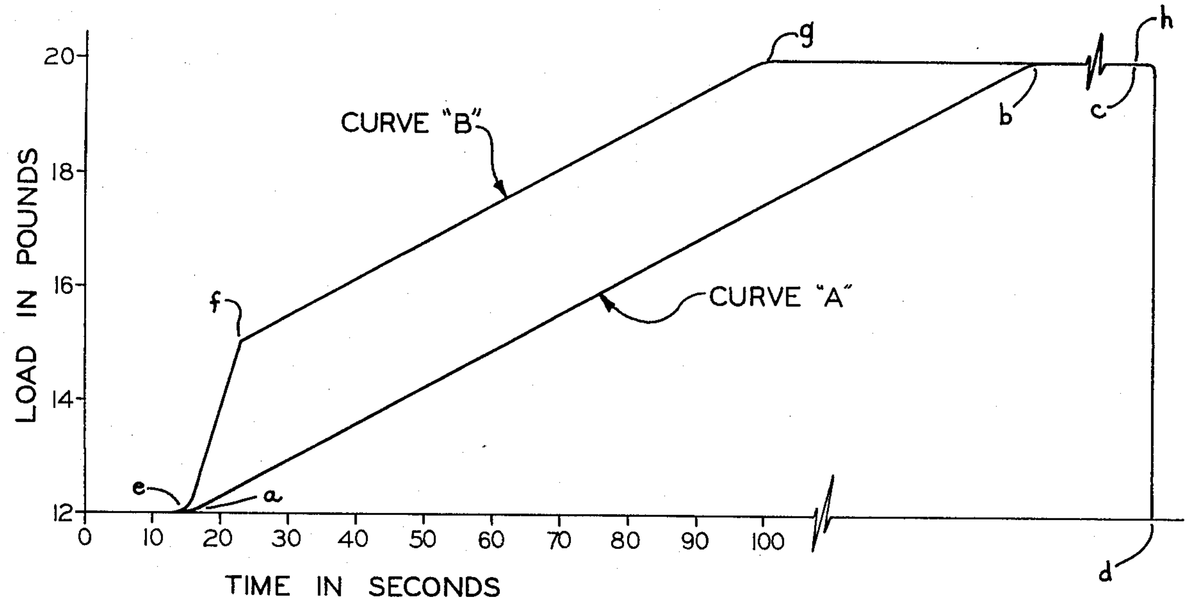
FIG. 5 is a graphical representation of the performance characteristics of the thermal actuators of FIGS. 1 and 3.

The performance characteristics of thermal actuator 7 is graphically presented in FIG. 5 by curve A thereof in which the load or working force of bellows 3 is plotted against time for effecting a cycle of the thermal actuator, and as shown by the graph, the bellows was preloaded against a force of approximately twelve pounds. The portion of curve A between the graph origin O and point a represents the time generally necessary to heat the relatively low thermal mass of boiler 1 and liquid 5 to the temperature for effecting vaporization of the liquid, and the portion of the curve between points a and b generally represents the time necessary to vaporize a predetermined volume of liquid 5 in boiler 1. It may be noted that the slope of curve A between points a and b will vary in accordance with the particular type of vaporizable liquids or mixtures thereof utilized. At point *b*, the curve becomes generally asymptotic to the horizontal, and at this time, substantially all of liquid 5 in boiler 1 has been vaporized and transferred to bellows 3. The portion of curve A between points b and c is broken, and this portion of the curve represents a variable amount of time which is dependent upon the preselected length of time PTCR 13 remains energized. Shortly after point c, which represents the time at which PTCR 13 is de-energized thereby to terminate heating of boiler 1, curve A turns sharply downwardly, and the portion of the curve between points c and d generally represents reset of thermal actuator 7. It may be noted that the slopes of curve A between points a and b and between points c and d are different so as to represent the different transfer rates or displacement rates of the vapor and the return of the liquid.

From the foregoing, it is apparent that thermal actuator 7 utilizes only the vapor vaporized from liquid 5 therein to attain a more gradual and controlled increase in pressure for establishing its working force as compared with prior art devices which effected the extremely rapid transfer of the liquid therein in its liquid state.

Figure 3:
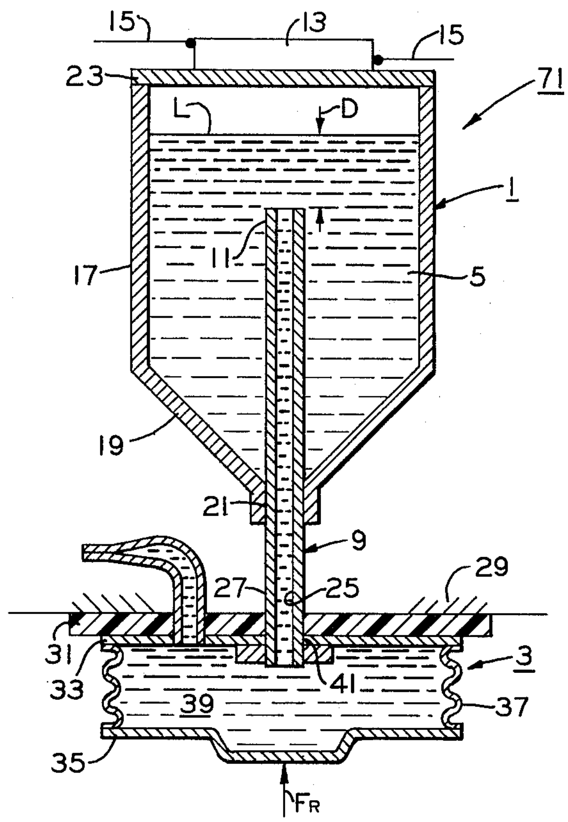
FIG. 3 is a schematic view illustrating an alternative thermal actuator also embodying one form of the present invention.
Figure 4:
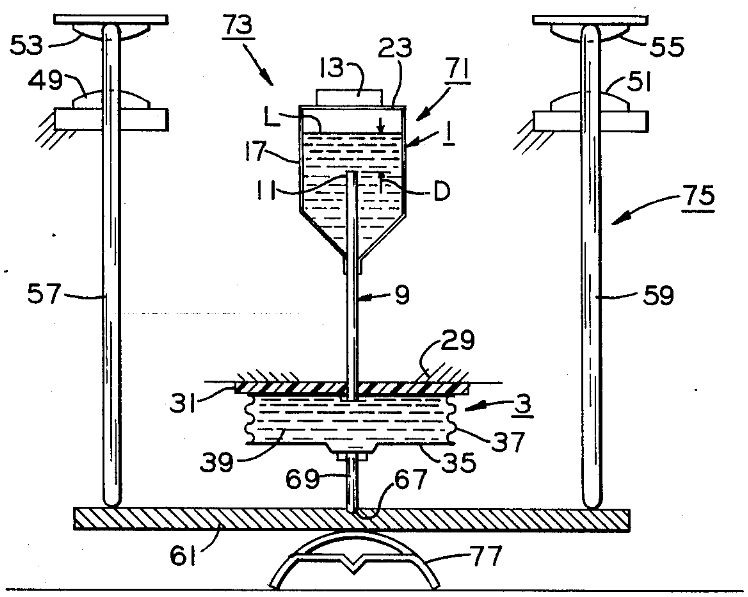
FIG. 4 is a schematic view illustrating the thermal actuator in an alternative actuating system for an electrical switch device also embodying one form of the invention.

Referring now to FIGS. 3 and 4, another thermal actuator 71, a method of driving such, and an actuating system 73 including thermal actuator 71 is illustrated, and thermal actuator 71 and actuating system 73 have generally the same component parts and function generally in the same manner as the previously described thermal actuator 7 and actuating system 45 with the following exceptions. However, it may be noted that thermal actuator 71, the method of driving such, and actuating system 73 each have advantages and novel features of their own some of which may be pointed out hereinafter and some of which will be apparent, and at least some of such advantages and novel features are independent and distinct from those discussed hereinabove with respect to thermal actuator 7, the method of driving such, and actuating system 45.

In general, a method in one form of the invention is illustrated for controlling the driving of an expansible one of a pair of means, such as boiler 1 and bellows 3, for containing vaporizable liquid 5 and communicated with each other in thermal actuator 71. In this method, only a portion of liquid 5 in its liquid state is displaced from the other of the containing means, such as boiler 1, to the expansible one of the containing means, such as bellows 3, to drive it by effecting vaporization of the liquid in the boiler under preselected conditions. At least a portion of liquid 5 remaining in boiler 1 is then vaporized, and at least a portion of this vapor is transferred from the boiler toward bellows 3 to further effect the driving thereof.

More particularly, upper or open end portion 11 of means, such as standpipe 9, for transferring or permitting displacement of liquid 5 and transferring vapor from boiler 1 is disposed a predetermined space or distance D beneath preselected level L of the liquid in the boiler. It may be noted that fill level L of liquid 5 in boiler 1 is less than the capacity of the boiler and may be of any desired level therein so long as it is above upper end portion 11 of standpipe 9. The actual depth of selected distance D is critical with respect to determining the amount of liquid 5 it is desirable to initially displace from boiler 1 to bellows 3 while thereafter transferring only vapors of the remaining liquid 5 in the boiler. In other words, the initial displacement of liquid 5 in its liquid state is very rapid and may be utilized to very quickly establish a bellows working force, as previously discussed, and the magnitude of such an initial, quickly established working force may also be predetermined by selecting the proper amount of liquid for initial displacement in its liquid state. Further, with upper end 11 of standpipe 9 geometrically positioned generally centrally of boiler 1, then thermal actuator 7 is substantially position insensitive, i.e., it operates in the same manner, as discussed hereinafter, in any position.

Vaporization of liquid 5 may be accomplished by energization of any suitable heating means, such as PTCR 13, thermally associated with boiler 1, as well known in the art. Energization of PTCR 13 heats boiler 1 and liquid 5 therein at least to a temperature effecting vaporization of the liquid which is accompanied by a corresponding increase in pressure in the boiler and bellows 3. The pressure so created in boiler 1 by the vapors established therein initially and rather rapidly displaces liquid 5 above upper end portion 11 of standpipe 9 through its passage 25 into expansible chamber 39 of bellows 3. When the initial displacement of liquid 5 in its liquid state reduces the level of the liquid in boiler 1 from predetermined fill level L to a level at least generally coextensive with upper end portion 11 of standpipe 9, i.e. by the distance D, then only vapor effected upon further vaporization of the remaining liquid in the boiler is subsequently transferred through the standpipe to the bellows. It may be noted that rate of displacement or transfer of liquid 5 in its liquid state from boiler 1 is predeterminately greater than the rate of transfer of vapor from the boiler. The vapor transferred or otherwise conducted through standpipe 9 to bellows 3 is condensed in the relatively cooler environs of the bellows, i.e., at least upon the subjection of the vapor to liquid 5 in the bellows. In this manner, the initial displacement of liquid 5 in its liquid state and the subsequent transfer of vapor in response to the vaporization of the liquid in boiler 1 increases the pressure in both the boiler and bellows 3 to expand or drive the bellows for effecting the output 3 to expand or drive the bellows for effecting the output or working force thereof.

Referring now in detail to FIG. 3, thermal actuator 71 has a pair of means, such as boiler 1 and bellows 3, for containing vaporizable liquid 5 and communicated with each other. Means, such as standpipe 9, within boiler 1 permits displacement or effects the transfer of only a portion of liquid 5 in its liquid state therefrom to bellows 3 and effects transfer of at least a portion of vapor vaporized from the remaining liquid in the bellows toward the bellows. In thermal actuator 71, it may be noted that upper or open end portion 11 of standpipe 9 is spaced the preselected distance D beneath predetermined fill level L of liquid 5 in boiler 1.

Referring now in general to FIG. 4, actuating system 73 has a driven device, such as for instance an electrical switch or relay or the like indicated generally at 75, and a pair of sources, such as boiler 1 and bellows 3, for vaporizable liquid 5. Means, such as standpipe 9, is provided for communicating boiler 1 and bellows 3 and includes means, such as the upper end portion 11 of standpipe 9 selectively spaced a distance D beneath predetermined fill level L, for transferring or effecting displacement of only a portion of the liquid from the boiler to the bellows and for transferring or effecting displacement of at least a portion of vapor vaporized from the liquid remaining in the boiler toward the bellows under preselected conditions. Bellows 3 includes means, such as expansible member 37 and lower end wall 35, actuated or movable in response to increasing pressure accompanying the displacement of liquid 5 and the vapor for driving driven device 75.

More particularly, electrical switch 75 is provided with a toggle 77 which is disposed generally centrally of lever 61 beneath pivot socket 67 therein, and toggle 77 is provided with a higher rate of negative spring gradient than the rate of positive spring gradient of bellows expansible member 37 so as to afford snap-action to movable contacts 53, 55 upon actuation of electrical switch 75, as discussed hereafter.

In the operation of actuating system 73 and thermal actuator 71, when PTCR 13 is energized in response to a certain or preselected condition, heat is conductively transmitted therefrom through closure member 23 and side wall 17 of boiler 1 to liquid 5 therein. When the temperature necessary to effect vaporization of heated liquid 5 is attained, the expansion of vapor so created is rather rapid and effects a corresponding increase in pressure within thermal actuator 71. The increasing pressure of the vapor in boiler 1 acts on liquid 5 therein forcing or displacing it in its liquid state through passage 25 in standpipe 9 into expansible chamber 39 of bellows 3 thereby to generally equalize the pressure between the boiler and the bellows. Of course, the establishment of pressure in bellows 3 effects the output or working force thereof in the same manner as previously discussed with respect to thermal actuator 7. Upon such transfer or displacement of liquid 5 in response to increased vapor pressure attained by heating of boiler 1, the level of the liquid in the boiler is reduced through the distance D from predetermined fill level L to a level generally coextensive with upper end portion 11 of standpipe 9. At this time, further displacement of liquid 5 in its liquid state through standpipe 9 is, of course, obviated. However, further heating of boiler 1 effects vaporization of at least part of the remaining liquid 5 in the boiler, i.e., the liquid below standpipe upper end portion 11, and the vapor illicited from the remaining liquid is transferred through standpipe 9 to bellows 3. In the relatively cooler environs of bellows 3, the vapor is condensed back to the liquid state, as previously discussed, and the pressure between the boiler and bellows becomes generally equalized so as to maintain the bellows filled with liquid. In this manner, it may be noted that initially only a predetermined amount or selected portion of liquid 5 in its liquid state is displaced from boiler 1 to bellows 3, and such initial displacement is extremely rapid and may be utilized to take up slack or the like in system 73 and initially effect actuation thereof. Subsequent thereto, only vapor vaporized from the remaining liquid 5 in boiler 1 is transferred therefrom to bellows 3 at a relatively slower and more controlled rate of displacement or transfer due to the latent heat of evaporation of the liquid for effecting actuation of system 73. Therefore, it may be noted that the rate of displacement or transfer of the predetermined amount of liquid 5 in its liquid state is greater than that of the vapor from boiler 1 to bellows 3.

As the vaporization of liquid 5 continues in response to further heating of boiler 1, pressure within thermal actuator 71 correspondingly increases which effects a corresponding increase in the magnitude of the working force delivered by bellows 3. The working force is transmitted from bellows 3 through connecting link 69 to lever 67 against the inherent resilient force of toggle 77. When the magnitude of the working force is increased to a value great enough to overcome the resilient force to toggle 77, lever 61 is moved downwardly effecting deflection of the toggle. Since deflection of toggle 77 imparts snap-action movement to lever 61, as previously discussed, the conjoint following movement of actuators 57, 59 with the lever effects generally conjoint snap-action closure of movable contacts 53, 55 into making engagement with stationary contacts 49, 51 respectively. After closure of contacts 49, 53, and 51, 55 as above described, thermal actuator 71 will reset itself thereby to terminate the cycle of actuating system 73 and permit repositioning of the components of electrical switch 75 for a subsequent cycle of the actuating system.

During reset under other preselected conditions, PTCR 13 is de-energized to terminate heating of boiler 1, and the boiler begins to cool effecting condensation of a slight amount of vapor therein which results in a corresponding slight decrease in pressure in the boiler. Upon this slight decrease in pressure, the relatively cooler liquid 5 in bellows 3 flows therefrom through passage 25 of standpipe 9 returning to boiler 1 thereby to generally equalize the pressure between the boiler and bellows. This return flow of relatively cool liquid 5 causes immediate additional condensation in boiler 1 by chilling the vapor therein thus causing additional return flow of liquid from bellows 3 to the boiler. In this manner, condensation of vapor in boiler 1 is rather rapid since the return flow of relatively cool liquid 5 from bellows 3 continues to chill the vapor in the boiler until the boiler is again filled to its predetermined fill level L. As pressure in thermal actuator 71 is reduced by the return flow of liquid 5 to boiler 1, as discussed above, the working force is correspondingly reduced and eventually overcome by the opposing resilient force of toggle 77 effecting the return of the components of electrical switch 75 to their original positions.

Turning again to FIG. 5, the performance characteristics of thermal actuator 71 is graphically present by curve B in which the load or working force of bellows 3 is plotted against time for effecting a cycle of the thermal actuator, and as shown by the graph, the bellows was preloaded against a force of approximately 12 pounds. The portion of curve B between the graph origin 0 and point e represents the time necessary to heat the relatively low thermal mass of boiler 1 and liquid 5 therein to the temperature for effecting vaporization of the liquid, and the portion of the curve between points *e* and *f* represents the displacement of the liquid in its liquid state from the boiler reducing the level of the liquid therein by the distance D from the fill level L. Generally at point *f*, the vaporization of the remaining liquid 5 in boiler 1 occurs, and the portion of curve B between points *f* and *g* represent the time necessary to effect substantially complete vaporization of the remaining liquid in the boiler. It may be noted that the slope of curve B between points *f* and *g* may vary in accordance with the characteristics of the particular type of vaporizable liquids or mixtures thereof utilized. At point *g*, curve B becomes generally asymptotic to the horizontal, and at this time, substantially all of the remaining liquid 5 in boiler 1 has been vaporized and transferred to bellows 3. The portion of curve B between points g and h is broken, and this portion of the curve represents a variable amount of time which is dependent upon the preselected length of time PTCR 13 remains energized. Shortly after point h, which represents the time at which PTCR is de-energized thereby to terminate heating of boiler 1, curve B turns sharply downwardly, and the portion of the curve between points h and d represents the reset of thermal actuator 71. It may be noted that the slopes of the portions of curve B between points *e* and *f* and between points *f* and *g* are different representing the different rates of displacement or transfer of liquid 5 in its liquid state and the transfer of vapor upon vaporization of the liquid.

While thermal actuators 7, 71 have been disclosed herein as operative in actuating systems 45, 73, respectively, it is contemplated that thermal actuator 7 can be utilized in actuating system 73 and that thermal actuator 71 can be utilized in actuating system 45.

From the foregoing, it is now apparent that novel thermal actuators 7, 71, novel methods of controlling the driving of such thermal actuators, and novel actuating systems 45, 73 are provided meeting the objects and advantageous features set out hereinbefore, as well as others, and it is contemplated that changes in the precise configurations, connections shapes and details of the structures and changes in the precise steps of the methods which are presented merely to illustrate the inventions may be made by those having ordinary skill in the art without departing from the spirit of the invention or the scope thereof as set out by the claims which follow.

What I claim as new and desire to secure by Letters Patent of the United States is:

1. A thermal actuator comprising a pair of means for containing a vaporizable liquid, one of said containing means being generally filled with the liquid and the other of said containing means being filled only to a selected fill level therein with the liquid, means thermally associated with said other containing means and operable generally between an energized state for heating only the liquid in said other containing means to effect its vaporization and a de-energized state so as to permit cooling of the vapor in said other containing means thereby to respectively establish pressure differentials acting in opposite directions between said containing means, means communicated with said containing means for effecting the transfer of the liquid from said other containing means to said one containing means at one transfer rate and the return of the transferred liquid at another transfer rate different than the one transfer rate, said transfer effecting means including a portion within said other containing means having an opening predeterminately disposed at least generally coextensively with the selected fill level for passing only vapor created in said other containing means through said transfer effecting means to said one containing means in response to the establishment of the pressure differential acting in one of the opposite directions when said heating means is in its energized state and the vapor being condensed back to the liquid at least when subjected to the relatively cooler liquid in said one containing means, and the return of the liquid at the other transfer rate through said transfer effecting means being effected in response to the establishment of the pressure differential acting in the other of the opposite directions when said heating means is in its de-energized state.

2. A thermal actuator as set forth in claim 1 wherein said transfer effecting means comprises a standpipe connected between said containing means and extending into at least said other containing means, said standpipe including said portion within said other containing means and said opening.

3. A thermal actuator as set forth in claim 1 further comprising means for generally thermally isolating said containing means from each other.

4. A thermal actuator as set forth in claim 1 wherein said one containing means includes an expansible portion for transmitting an output force, said expansible portion being responsive to the establishment of the pressure differential acting in the one of the opposite directions to establish the output force.

5. A thermal actuator as set forth in claim 1 wherein said heating means comprises a PTC resistor disposed in heat transfer relation with said other containing means.

6. A thermal actuator comprising a pair of means for containing a vaporizable liquid, and means connected between said containing means for initially permitting the transfer of only a selected portion of the liquid in its liquid state from one of said containing means to the other of said containing means and for thereafter effecting only the transfer of at least a portion of vapor vaporized from the remaining liquid in said one containing means toward said other containing means, the vapor so transferred being condensed back to the liquid state at least when subjected to the liquid in said other containing means.

7. A thermal actuator as set forth in claim 6 wherein said transfer permitting and effecting means includes an opening predeterminately spaced below a preselected fill level of the liquid in said one containing means.

8. A thermal actuator as set forth in claim 7 wherein said transfer permitting and effecting means comprises a standpipe extending into at least said one containing means, said opening being disposed in said standpipe.

9. A thermal actuator as set forth in claim 6 wherein the rate of transfer of the selected portion of the liquid between said containing means through said transfer permitting and effecting means is different than the rate of transfer of the vapor therebetween.

10. A thermal actuator as set forth in claim 6, further comprising means associated with the one containing means for heating the liquid therein to effect its vaporization.

11. A thermal actuator as set forth in claim 10, wherein said heating means comprises a PTC resistor disposed in heat transfer relation with said one containing means.

12. A thermal actuator as set forth in claim 6 wherein said other containing means includes an expansible portion for transmitting an output force, said expansible portion being responsive to pressure increases accompanying both the transfer of the selected portion of the liquid and the transfer of the vapor from said one containing means to said other containing means to establish the output force.

13. A method of controlling the driving of an expansible one of a pair of means for containing a vaporizable liquid in a thermal actuator, the expansible one of the containing means being generally filled with the liquid and the other of the containing means being filled only to a preselected fill level therein with the liquid, and means connected between the containing means for transferring liquid therebetween, the transferring means extending into the other containing means and having an opening at a level therein at least generally coextensive with the preselected fill level thereof, said method comprising the steps of:

a. heating the liquid in the other containing means and vaporizing at least a portion of the liquid therein;
b. transferring the at least a portion of the liquid so vaporized during the heating and vaporizing step from the other containing means through the transferring means and its opening to the expansible one of the containing means and condensing the vapor so transferred back to the liquid state at least upon subjection thereof to the liquid in the expansible one of the containing means so as to effect the driving thereof; and
c. cooling the other containing means to effect the return flow of the liquid from the expansible one of the containing means through the transferring means and its opening to the other containing means so as to terminate the driving of the expansible one of the containing means.

14. A method of controlling the driving of an expansible one of a pair of means for containing a vaporizable liquid in a thermal actuator, and means connected between the containing means for transferring liquid therebetween including an opening communicating the containing means and disposed within the other of the containing means at a level predeterminately spaced below a preselected fill level of the liquid in the other containing means, said method comprising the steps of:

a. heating the liquid in the other containing means to effect vaporization of at least a part of the liquid and displacing in response to the at least a part of the liquid so vaporized only the portion of the liquid between the fill level of the other containing means and the opening generally at a first displacement rate from the other containing means through the transferring means and its opening to the expansible one of the containing means to initially effect the driving thereof; and b. vaporizing at least a part of the liquid remaining in the other containing means upon the further heating thereof and transferring at least a part of the vapor so vaporized from the other containing means through the transferring means and its opening toward the expansible one of the containing means generally at another displacement rate different than the first displacement rate to further effect the driving of the expansible one of the containing means.

15. The method as set forth in claim 14, wherein the vaporizing and transferring step includes condensing the transferred vapor back to its liquid state at least upon the subjection of the transferred vapor to the liquid in the expansible one of the containing means.

16. The method as set forth in claim 15 comprising the additional step of cooling the other containing means to effect a return flow of the liquid at still another displacement rate greater than the first named displacement rate and the other displacement rate from the expansible one of the containing means through the transferring means and its opening to the other containing means so as to terminate the driving of the expansible one of the containing means.

17. An actuating system comprising a driven device, a pair of sources of a vaporizable liquid, one of said sources being generally filled with the liquid and the other of said sources being filled to a preselected fill level therein with the liquid, means for transferring the liquid between said sources including means operable generally for passing only vapor vaporized from the liquid in said other source upon the occurrence of a preselected condition from said other source generally at one rate of transfer toward said one source so as to reduce the liquid in said other source below the preselected level, the vapor so transferred being condensed back into the liquid at least when subjected to the liquid in said one source, and said one source including means responsive to the liquid so transferred to said one source for driving the driven devices, the liquid so transferred to said one source being returned therefrom through said transferring means to said other source at another rate of transfer different than the one rate of transfer to terminate the driving of the driven device by the driving means and to restore the liquid in said other source at least to the preselected fill level upon the occurrence of another preselected condition.

18. An actuating system as set forth in claim 17 wherein said transferring means includes a passage connected between said sources and said passage having an opening within said other source predeterminately disposed at least generally coextensively with the preselected fill level of the liquid in said other source, said opening constituting said passing means.

19. An actuating system as set forth in claim 17 further comprising means operable generally between an energized state upon the occurrence of the first named preselected condition for heating the liquid in said other source to effect the vaporization thereof and a deenergized state upon the occurrence of the other preselected condition to permit cooling of said other source with respect to the liquid in said one source.

20. An actuating system as set forth in claim 19, wherein said heating means comprises a PTC resistor thermally associated with said other source.

21. An actuating system comprising a driven device, a pair of sources for a vaporizable liquid, means for communicating said sources including means for initially transferring only a selected portion of the liquid in its liquid state fron one of said sources to the other of said sources generally at one transfer rate and for thereafter transferring only vapor vaporized from at least a part of the liquid remaining in said one source toward said other source at another transfer rate upon the occurrence of a preselected condition, the vapor so transferred being condensed back to the liquid state at least when subjected to the liquid in said other source, and said other source including means responsive to the liquid transferred from said one source to said other source for driving the driven device, the liquid transferred to said other source being returned therefrom through said communicating means to said one source to terminate the driving of the driven device by the driving means upon the occurrence of another preselected condition.

22. An actuating system as set forth in claim 21, wherein said transferring means includes means within said one source for receiving the selected portion of the liquid and the vapor, and said receiving means being predeterminately spaced beneath a predetermined fill level of the liquid in said one source.

23. An actuating system as set forth in claim 21 wherein said communicating means comprises a standpipe extending into at least said one source, and a passage in said standpipe communicating said sources and having an opening spaced a selected distance beneath a predetermined fill level for the liquid in said one source, said passage and opening constituting said transferring means.

24. An actuating system as set forth in claim 21 further comprising means operable generally between energized and deenergized states for heating the liquid in said one source at least to the vaporization temperature thereof and to effect cooling of said one source upon the occurrence of the first named and other preselected conditions, respectively.

25. An actuating system as set forth in claim 24 wherein said heating means comprises a PTC resistor disposed in heat transfer relation with said one source.

26. A thermal actuator comprising a pair of means for containing a vaporizable liquid, one of said containing means being generally filled with the liquid and the other of said containing means being filled only to a preselected fill level therein with the liquid, means for communicating said containing means constituting the sole fluid transfer connection therebetween and including passage means having an end portion disposed within said other containing means generally above the fill level of the liquid therein for effecting only the transfer of vapor vaporized from the liquid in said other containing means through said passage means toward said one containing means, the vapor so transferred being condensed back to the liquid state at least when subjected to the liquid in said one containing means, and said passage means also accommodating return of the liquid so transferred from said one containing means to said other containing means so as to restore the liquid therein to the preselected fill level.

27. A thermal actuator comprising means for containing a vaporizable fluid, means actuated for exerting work in response to liquid transferred thereto from said containing means, said containing means being filled only to a selected fill level therein with the liquid and said work exerting means being generally completely filled with the liquid, and means for communicating said containing means and said work exerting means including means disposed within said containing means at least generally coextensively with the preselected fill level for transferring generally at one transfer rate only vapor vaporized from the liquid in said containing means toward said work exerting means, the vapor being condensed back to the liquid at least upon subjection to the liquid in said work exerting means so as to effect the actuation thereof, and said transferring means also accommodating return of the transferred liquid at another transfer rate different than the one transfer rate from said work exerting means to said containing means to restore the liquid therein to the preselected fill level.

28. A thermal actuator comprising a pair of means for containing a vaporizable liquid, one of said containing means including means actuated for performing work in response to the liquid transferred from the other of said containing means to said one containing means, means associated with said other containing means and operable generally for vaporizing at least a part of the liquid therein to establish a pressure differential between said containing means and effect the liquid transfer, and means for communicating said containing means including means within said other containing means for initially effecting the transfer generally at one transfer rate of only a selected portion of the liquid in its liquid state from said other containing means to said one containing means in response to the established pressure differential to initially actuate said work performing means and for thereafter effecting the transfer to said one containing means generally at another transfer rate of only vapor vaporized from the remaining liquid in said other containing means upon the operation of said vaporizing means, the vapor so transferred being condensed back to the liquid state at least when subjected to the liquid in said one containing means to further actuate said work performing means.

29. A thermal actuator comprising a boiler, a chamber in said boiler filled to a selected fill level with a vaporizable liquid, means for performing work including a bellows having an expansible chamber generally filled with the liquid, and a wall on said bellows subjected to said expansible chamber and responsive to the pressure of the liquid acting thereon to effect the performance of the work, a conduit connected between said boiler and said bellows for communicating said first named chamber and said expansible chamber including a portion extending into said first named chamber, and an opening in said conduit portion disposed generally above the selected fill level of the liquid in said first named chamber, and means disposed in heat transfer relation with said boiler for heating it upon the occurrence of a preselected condition to effect the vaporization of at least a part of the liquid in said first named chamber thereby to establish a pressure differential between said first named chamber and said expansible chamber, only the vapor created upon the vaporization of the at least part of the liquid in said first named chamber being transferred therefrom in response to the established pressure differential through said opening and said conduit toward said expansible chamber, the vapor so transferred being condensed back to the liquid state at least when subjected to the liquid in said expansible chamber and said wall being responsive to the increased pressure of the transferred liquid acting thereon in said expansible chamber to effect the performance of the work.

30. A thermal actuator comprising a boiler, a chamber in the boiler filled to a selected fill level with a vaporizable liquid, means for performing work including a bellows having an expansible chamber generally filled with the liquid, and a wall on said bellows subjected to said expansible chamber and responsive to the pressure of the liquid therein to effect the performance of the work, a conduit connected between said boiler and said bellows for communicating said first named chamber and said expansible chamber including a portion extending into said first named chamber, and an opening in said conduit portion disposed a predetermined distance below the selected fill level of the liquid in said first named chamber, and means disposed in heat transfer relation with said boiler for heating it upon the occurrence of a preselected condition to effect the vaporization of at least a part of the liquid in said first named chamber thereby to establish a pressue differential between said first named chamber and said expansible chamber, the liquid generally between said opening of said conduit portion and the selected fill level in said first named chamber being displaced therefrom at a first displacement rate in response to the established pressure differential through said opening and said conduit into said expansible chamber acting on said wall to effect the work performance thereof and thereafter upon vaporization of at least a part of the remaining liquid generally below said opening of said conduit portion in said first named chamber by said heating means only the vapor is displaced at another displacement rate less than the first displacement rate from said first named chamber through said opening and said conduit toward said expansible chamber, the displaced vapor being condensed back to the liquid state at least upon subjection to the liquid in said expansible chamber so as to act on the wall and further effect the work performance thereof.

* * * * *